United States Patent [19]

Marrs et al.

[11] 4,129,541

[45] Dec. 12, 1978

[54] ASPHALTIC COMPOSITIONS CONTAINING CONJUGATED DIENE-MONOVINYL-SUBSTITUTED AROMATIC HYDROCARBON COPOLYMERS OF PARTICULAR STRUCTURES

[75] Inventors: Oren L. Marrs; Robert E. Reusser, both of Bartlesville, Okla.

[73] Assignee: Phillips Petroleum Company, Bartlesville, Okla.

[21] Appl. No.: 845,706

[22] Filed: Oct. 26, 1977

[51] Int. Cl.$^2$ .............................................. C08L 91/00
[52] U.S. Cl. .......................... 260/28.5 AS; 260/28.5 B; 428/489
[58] Field of Search ..................... 260/28.5 AS, 28.5 B

[56] References Cited

U.S. PATENT DOCUMENTS

| | | | |
|---|---|---|---|
| 2,815,296 | 12/1957 | Young et al. .......................... 106/273 |
| 3,265,765 | 8/1966 | Holden et al. .......................... 260/876 |
| 3,354,105 | 11/1967 | Trieschock ............................ 260/28 |
| 3,565,842 | 2/1971 | Pitchford ............................. 260/28.5 |
| 3,639,521 | 2/1972 | Hsieh ................................... 260/880 |
| 3,753,936 | 8/1973 | Marrs ................................... 260/27 R |
| 3,778,397 | 12/1973 | Gannon et al. ................. 260/28.5 AS |
| 3,856,732 | 12/1974 | Bresson et al. ................. 260/28.5 AS |
| 3,978,014 | 8/1976 | vanBeem et al. ............. 260/28.5 AS |
| 4,008,095 | 2/1977 | Fukushima et al. .................. 106/235 |

FOREIGN PATENT DOCUMENTS 740027 8/1966 Canada ............................ 260/28.5 AS

*Primary Examiner*—Melvyn I. Marquis

[57] ABSTRACT

An asphaltic composition having low temperature flexibility and resistance to stress cracking, shearing or adhesive failure is prepared using conjugated diene-monovinyl substituted aromatic hydrocarbon copolymers prepared in absence of polar-type randomizers, e.g., tetrahydrofuran, or by incremental addition of both the monovinyl substituted aromatic hydrocarbon and initiator, e.g., organomonolithium. The composition is especially useful in cold places, e.g., as a coating for objects to be stored or kept in cold ground, above ground or under the sea.

12 Claims, No Drawings

ASPHALTIC COMPOSITIONS CONTAINING CONJUGATED DIENE-MONOVINYL-SUBSTITUTED AROMATIC HYDROCARBON COPOLYMERS OF PARTICULAR STRUCTURES

This invention relates to compositions containing asphalt and a synthetic copolymer. In one of its aspects, the invention relates to a composition comprising asphalt, aggregate and a synthetic rubbery copolymer prepared from a conjugated diene and a monovinyl-substituted aromatic hydrocarbon. More specifically, the invention relates to such a composition in which the copolymer used has been prepared in a manner to yield a copolymer having a particular structure.

In one of its concepts, the invention provides an asphalt containing composition, which may also contain aggregate, a filler and even a fibrous material, the composition also containing a conjugated diene/monovinyl aromatic radial teleblock copolymer having been prepared by copolymerizing a conjugated diene having 4 to 8 carbon atoms with a monovinyl-substituted aromatic hydrocarbon having 8 to 12 carbon atoms in the presence of an organolithium initiator but in absence of a randomizer or, in the alternative, by incremental addition of both monovinyl-substituted aromatic hydrocarbon and initiator, said copolymer having a poly(monovinyl-substituted aromatic hydrocarbon) portion which has a weight average molecular weight of at least 7.5% of the weight average molecular weight of the copolymer, the weight ratio of conjugated diene to vinyl aromatic hydrocarbon being in the approximate range of from about 60-95/40-5 and the weight average molecular weight of the copolymer being in the approximate range of from about 70,000 to 300,000. In another of its concepts, the copolymer is prepared in the absence of randomizer, as herein described, and will have a weight average molecular weight of the poly(monovinyl-substituted aromatic hydrocarbon) portion of at least about 10% of the weight average molecular weight of the copolymer.

In a further concept of the invention, the conjugated diene is selected from 1,3-butadiene, isoprene, 2,3-dimethyl-1,3-butadiene, piperylene, 2,4-hexadiene, and 1,3-octadiene, the now preferred dienes being 1,3-butadiene and isoprene; the monovinyl substituted aromatic hydrocarbon being selected from styrene, 3-methylstyrene, 4-n-propylstyrene, 4-t-butylstyrene, styrene being the preferred of the monomers.

The pipeline industry currently uses a mastic type coating formulation consisting of asphalt, sand, and a small amount of fibrous filler to provide corrosion resistance for metal pipe. As the use of these coatings are extended to pipelines in colder climates and in undersea installations, more flexible and yet tougher coatings are desired. Because of the heavy sand, these particular type coatings add to the weight of the pipe and thereby significantly contribute to negative buoyancy (ability to stay submerged) of the pipe, and important feature when the pipe is also coated with concrete for off-shore and marsh land pipeline installations. In recent years, the off-shore lines are being laid in deeper and colder environments. This requires the coating to be able to withstand the rough handling when laid from barges as in the North Sea area. Enough flexibility is required at 4.4C (40F) or lower so that no *stress cracking*, shearing or adhesive failure occurs as the large diameter pipes move from the barge to the ocean floor. Maximum stress occurs at the "overbend" on the barge and at the "sag bend" as it is suspended in the water. In addition, the coating must sustain other mechanical stresses resulting in large tensile and compressive forces which can become quite severe, particularly under inclement weather conditions.

Not all of the above difficulties have been solved, although many have been considerably reduced. Investigators have continually sought to develop asphaltic coating compositions that provide for a longer service life thereby reducing maintenance and installation costs. Many of these efforts have been directed towards improving the resistance to cracking, a major performance property, sought by many pipeline manufacturers and users.

An object of the invention is to provide a composition containing an asphalt and a synthetic rubber. Another object of the invention is to provide such a composition having improved flexibility even at low temperatures rendering the same resistant to stress cracking, shearing or adhesive failure, e.g., a composition useful as a coating of an object to be kept or stored in a cold place, as in the cold ground or as under the sea. A further object of the invention is to provide a composition containing asphalt and a synthetic rubber of the copolymer type produced from a conjugated diene and a monovinyl-substituted aromatic hydrocarbon suitable for use in mastic type coatings containing asphalt, aggregate, fibrous filler, etc.

Other aspects, concepts, objects and the several advantages of the invention are apparent from a study of this disclosure and the appended claims.

According to the present invention, there is provided an improved composition adapted for coating of an object to be protected which comprises asphalt, aggregate, and as may be desired a fibrous filler, and a conjugated diene/monovinyl aromatic radial teleblock copolymer said copolymer having been prepared by copolymerizing a conjugated diene having 4 to 8 carbon atoms with a monovinyl-substituted aromatic hydrocarbon having 8 to 12 carbon atoms in presence of an organolithium initiator but in absence of randomizer or by the incremental addition of both monovinyl-substituted aromatic hydrocarbon and initiator, said copolymer having a poly(monovinyl-substituted aromatic hydrocarbon) portion with a weight average molecular weight of at least 7.5% of the weight average molecular weight of the copolymer.

Also according to the invention, in its now preferred form, the weight ratio of a conjugated diene to vinyl aromatic hydrocarbon is in the approximate range 60-95/40-5, and the weight average molecular weight of the copolymer is in the approximate range 70,000-300,000.

The composition of the invention can be prepared by blending the ingredients in conventional manner, and it can be applied as a hot mix.

The composition is especially adapted to be used as protective and insulative coating as for pipelines. The addition of the copolymer to the asphaltic composition provides an improvement in the ability of the composition to resist cracking, particularly at low temperatures.

The copolymers of the invention are of a special or particular type. They are distinguishable from typical rubbery conjugated dienes/vinyl aromatic teleblock copolymers by several fold increase in weight average molecular weight within the polyvinyl aromatic portion of the copolymer. It will be obvious from the general formula shown below that teleblock copolymers employed in this invention can be either linear or radial.

These polymers are represented by the general formula $(AB)_nZ$ where A is the polyvinylaromatic segment, B is the poly conjugated diene portion, Z is the coupling agent residue, and n is 2,3, or 4. These polymers are prepared by either conducting the polymerization in the absence of a randomizer such as tetrahydrofuran or by the incremental addition of monomer, as described herein.

Teleblock Copolymers

Teleblock copolymers useful in the rubberized asphalt composition described in this invention are those based on the radial teleblock structure having the following specifications:

|  | Broad Range | Preferred Range |
|---|---|---|
| Weight Ratio of Conjugated Diene/Vinyl Aromatic | 60–95/40–5 | 70–85/30–15 |
| Molecular Weight (weight average) | 70,000–350,000 | 125,000–200,000 |

The preparation of these type copolymers has been described in U.S. Pat. No. 3,639,521, the disclosure of which is incorporated herein by reference. The objectives of the present invention are attained employing the manner of preparation herein described. The asphalt-copolymer compositions of the invention are noted to contain minor proportions of the copolymers.

Also incorporated herein by reference are disclosures of U.S. Pat. Nos. 3,753,936, Aug. 21, 1973 and 4,008,095, Feb. 15, 1977, respectively disclosing polymerizations in absence of randomizers to produce products for adhesives and use of various synthetic rubbers as modifiers for components including asphalt. U.S. Pat. No. 3,778,397, Dec. 11, 1973, discloses a method for incorporating polymer, rubber, and asphalt in a paving composition.

The physical characteristics of 1,3-butadiene/styrene (Bd/Sty) copolymers prepared in the absence of tetrahydrofuran and used in this invention, including the controls, are shown as follows:

The polymers used in this invention can be employed in the asphalt portion of the mastic composition over the broad range of 2 wt. % to 20 wt. %. The preferred range is about 3 wt. % to 12 wt. %. The optimum polymer concentration is dependent on a number of variables such as the specific application involved, type of polymer and asphalt employed, and filler type. However, those skilled in the art recognize this optimum level to be whatever is necessary to maintain satisfactory performance and physical properties such as hardness and melt flow.

Mineral Aggregate

Mineral aggregates which are useful in the composition (mastics) of this invention include small crushed rock, gravel, sand, etc. Any size distribution of aggregate particles which gives a pipeline coating with the desired characteristics is within the scope of this invention. However, in order to obtain particularly useful density, flexural strength, crack resistance, etc., it is currently preferable to employ sand characterized in that from 50 to 90 weight percent passes through a 6 mesh screen and is retained on a 30 mesh screen and from 10 to 50 weight percent passes through a 30 mesh screen and is retained on a 100 mesh screen.

Mineral Filler

A finely divided mineral filler, such as limestone dust, Portland cement, talc, clay (e.g., kaolin), silicates, etc., is employed in the composition of this invention. Although not a mineral filler, carbon black can also be used as a filler or reinforcing agent. While any of said fillers which result in compositions of the desired properties are useful, it is currently preferable to use limestone dust which has 10 to 50 weight percent between 100 and 200 mesh, 45 to 85 weight percent between 10 and 100 mesh and from 0 to 10 weight percent larger than 10 mesh.

Fibrous Fillers

The fibers used in this invention can be of natural origin or synthetic. The natural origin fibers are, but not limited to, asbestos, cellulose, and the like. Glass fibers can also be used. The synthetic fibers employed in this invention can include those based on polyesters, poly-

|  | 60 Bd/40 Sty | | 75 Bd/25 Sty | | 80 Bd/20 Sty | | 85 Bd/15 Sty |
|---|---|---|---|---|---|---|---|
|  | Polymer A | Polymer B | Polymer C | Polymer D | Polymer E | Polymer F | Polymer G |
| n-BuLi[a], phm | 0.27 | 0.2 | 0.19 | 0.19 | 0.17 | 0.19 | 0.19 |
| THF[b], phm | 0.1 | 0 | 0.05 | 0 | 0.05 | 0 | 0.05 |
| SiCl$_4$, phm | 0.211 | 0.133 | 0.126 | 0.126 | 0.113 | 0.126 | 0.126 |
| Melt Flow[c] | 2.2 | 1.4 | 0.5 | 0.3 | 0.7 | 0.1 | 2.4 |
| IV[d] | 0.80 | 0.72 | 0.96 | 0.98 | 1.06 | 1.14 | 1.05 |
| $M_w \times 10^{-3}/M_n \times 10^{-3}$[e] | 130/100 | 145/123 | 168/128 | 162/131 | 154/122 | 170/133 | 156/124 |
| H.I.[f] | 1.34 | 1.18 | 1.31 | 1.24 | 1.26 | 1.28 | 1.25 |
| Styrene, %[g] | 40 | 44.5 | 23.8 | 24.7 | 20.0 | 20.0 | 14.9 |
| Polystyrene, %[h] | 36 | 42.4 | 22.7 | 22.7 | 18–20 | 18.3 | 11.4 |
| Vinyl, %[i] | 4.7 | 6.4 | 8.6 | 7.5 | 8.5 | 8.0 | 9.2 |
| Trans, %[i] | 11 | 28.9 | 31.0 | 38.3 | 38.6 | 39.8 | 41.2 |
| Polystyrene Portion | | | | | | | |
| $M_w \times 10^{-3}/M_n \times 10^{-3}$[e] | 10.0/9.0[j] | 14.7/12.5 | 8.2/7.2 | 31.1/15.1 | 8.9/7.6 | 19.3/13.9 | 2.7/2.3 |
| H.I.[f] | 1.11 | 1.18 | 1.14 | 2.1 | 1.17 | 1.38 | 1.22 |

[a] n-Butyl lithium initiator, phm = parts per hundred monomer
[b] Tetrahydrofuran, phm = parts per hundred monomer
[c] 180 C; 5 Kg
[d] Inherent Viscosity
[e] Weight Average Molecular Weight/Number Average Molecular Weight determined by Gel Permeation Chromatography using viscosities for calculations and standards for constants.
[f] Heterogeneity Index
[g] Determined by Ultraviolet
[h] Determined by oxidative degradation using osmonium tetraoxide catalyst
[i] Determined by Infrared
[j] Determined on laboratory sample amides, polyfluorocarbons, poly(arylene sulfide), and the like. Useful polyesters include the well-known poly(ethylene terephthalate) and poly(1,4-cyclohexanemethylene terephthalate). Useful polyamides include nylons, such as nylon-6, nylon-66, etc., as well as other aliphatic and aromatic containing polyamides, such as pACM-9 [polyamide from bis (p-aminocyclohexyl) methane and azelaic acid] and $_m$PD-I (polyamide from m-phenylenediamine and isophthalic acid). Common polyfluorocarbons such as poly(tetrafluoroethylene) and fluorinated ethylene-propylene copolymers are useful in the preparation of fibers for use in this invention. Poly(arylene sulfide) fibers, such as poly(p-phenylenesulfide) fibers, for example, those described in U.S. Pat. Nos. 3,895,091, 3,898,204, or 3,919,177 are useful in preparing the compositions of this invention. The fibers herein described are generally 1 to 15 mm in length and should be capable of resisting heat in excess of about 149° C.–177° C. (300° F.–350° F.).

Preparation of Coating

In the preparation of the coating it is generally desirable to premix the radial teleblock copolymer and asphalt prior to mixing with the aggregate, mineral filler and fibrous material. The premixing of the asphalt and radial teleblock can be accomplished at elevated temperature (e.g., 175° to 225° C.) using any desired procedure to produce a homogeneous dispersion.

The aggregate, mineral filler and fibrous material are preferably preblended by any method well-known in the art prior to mixing with the premixed copolymer and asphalt.

The coating composition of this invention is prepared by mixing premixed copolymer and asphalt and the preblended aggregate, mineral filler and fibrous material in any manner which produces a coating composition having the desired properties. It is currently preferable to employ a pugmill for said mixing. It is also within the scope of this invention to preheat the asphalt and copolymer premix and the aggregate, filler and fibrous material preblend to a temperature below the melting point of the fibrous material, e.g., 175° to 260° C., and simply mix them together by any means well-known in the art.

The application of the hot mastic to the exterior surface of a primed or unprimed pipe is accomplished by techniques well-known in the art. The total layer of mastic applied to the exterior of the pipe will generally have a thickness of about 0.5 mm to about 40 mm.

Proportions of Components of Coating

The components of the pipeline coating are generally employed in amounts given in the following table.

| Ingredient | Weight Percent Broad | Weight Percent Preferred |
|---|---|---|
| Mineral aggregate | 50–70 | 55–65 |
| Finely divided mineral filler | 15–35 | 20–30 |
| Asphalt | 5–20 | 8–15 |
| Fibrous material | 0.05–0.5 | 0.1–0.5 |
| Teleblock copolymer | 0.1–4.0 | 0.6–1.8 |

EXAMPLE I

The mastic compositions described herein were prepared in accordance with the following recipe:

| Components | Parts by Weight |
|---|---|
| Sand | 58.94 |
| Limestone | 27.98 |
| Fiber glass[1] | 0.19 |
| Asphalt | 11.60 |
| Radial teleblock copolymer | 1.29 |

[1]Owens-Corning Chopped Continuous Strand, JTX-7048, 6.5 mm length.

The sand employed in the above recipe had a particle size distribution as follows:

| Screen Size, Mesh[1] | | |
|---|---|---|
| Passing Through | Retained On | Weight Percent |
| 6 | 8 | 29 |
| 8 | 16 | 36 |
| 16 | 30 | 19 |
| 30 | 50 | 9 |
| 50 | 100 | 7 |

[1]U.S. Standard Sieve Series

The limestone employed in the above recipe had the following particle size distribution:

| Screen Size, Mesh | | |
|---|---|---|
| Passing Through | Retained On | Weight Percent |
|  | 10 | 10 |
| 10 | 20 | 10 |
| 20 | 50 | 30 |
| 50 | 60 | 0 |
| 60 | 100 | 25 |
| 100 |  | 25 |

For the following runs the copolymer was dispersed in the appropriate asphalt by stirring and heating the mixture at 205° C. A preblended (manually mixed at room temperature) mixture of sand, limestone and glass fibers was heated to about 200° C. and mixed manually into the asphalt/copolymer premix at 205° C. The resulting hot mastics were placed in molds 13 cm × 2.5 cm × 0.65 cm and molded at 190° C. and 13,700 kPa for 5 minutes.

The following table contains evaluation data obtained on compositions prepared according to this invention and also according to the prior art.

TABLE I

| | | | | | |
|---|---|---|---|---|---|
| | Mastics Employing Type II Asphalt[1] | | | | |
| | | | 5% Polymer Concentration[2] | | |
| | Base Polymer | | Crack Time[4], 32F (0° c) | | Flexural |
| Polymer | Bd/S Ratio | THF, phm[3] | Seconds | % Change | Strength[5], MPa (PSI) |
| Control | (no polymer) | — | 32 | 0 | 6.35 (921) |
| A | 60/40 | 0.1 | 24 | −25.0 | 6.14 (891) |
| B | 60/40 | 0 | 36 | +12.5 | 6.35 (921) |
| C | 75/25 | 0.05 | 31.9 | −0.3 | 5.94 (861) |
| D | 75/25 | 0 | 32.7 | +2.2 | 5.94 (861) |
| E | 80/20 | 0.05 | 30 | −6.3 | 4.58 (665) |
| F | 80/20 | 0 | 29.6 | −7.5 | 5.63 (816) |

TABLE I-continued

Mastics Employing Type II Asphalt[1]

5% Polymer Concentration[2]

| Base Polymer | | | Crack Time[4], 32F (0° c) | | Flexural |
|---|---|---|---|---|---|
| Polymer | Bd/S Ratio | THF, phm[3] | Seconds | % Change | Strength[5], MPa (PSI) |
| G | 85/15 | 0.05 | 24.7 | −22.8 | 6.14 (890) |

[1] Air-blown asphalt, 15–17 Penetration Grade
[2] Weight percent of copolymer in asphalt/copolymer premix
[3] Amount of tetrahydrofuran randomizer used in preparation of the copolymer
[4] Determined on molded bars 13 cm × 2.5 cm × 0.65 cm using Instron Testing Machine. Bars were placed on supports 10.2 cm apart. Load was applied to center of test bar using 1.9 cm diameter mandrel at a rate of 0.5 cm/min. Crack time was recorded as time in seconds for intital crack formation. Test conducted at or near 32F.
[5] Flexural strength determined from stress-strain curve obtained in crack time test (footnote 4) using a formula outlined in ASTM D-790.

TABLE II

Mastics Employing 40–50 Pen. Asphalt[1]

10% polymer Concentration[2]

| Base Polymer | | | Crack Time[4] | | Strength[5], MPa (PSI) |
|---|---|---|---|---|---|
| Polymer | Bd/S Ratio | THF, phm[3] | Seconds | % Change | |
| Control | (no polymer) | — | 60 | 0 | 6.25 (906) |
| A | 60/40 | 0.1 | 73 | +21.7 | 3.41 (494) |
| B | 60/40 | 0 | 101 | +68.3 | 5.21 (755) |
| C | 75/25 | 0.05 | 60.7 | +1.2 | 4.40 (638) |
| D | 75/25 | 0 | 83.6 | +39.3 | 3.39 (491) |
| E | 80/20 | 0.05 | Data not available | | |
| F | 80/20 | 0 | 81.6 | +36.0 | 3.30 (479) |
| G | 85/15 | 0.05 | 47.9 | −20.2 | 4.25 (617) |

[1] Non-air-blown type asphalt
[2] Weight percent of copolymer in asphalt/copolymer premix
[3] Amount of tetrahydrofuran randomizer used in preparation of the copolymer. Runs B, D, & F are runs according to the invention.
[4] Determined on molded bars 13 cm × 2.5 cm × 0.65 cm using Instron Testing Machine. Bars were placed on supports 10.2 cm apart. Load was applied to center of test bar using 1.9 cm diameter mandrel at a rate of 0.5 cm/min. Crack time was recorded as time in seconds for initial crack formation. Test conducted at or near 32F.
[5] Flexural strength determined from stress-strain curve obtained in crack time test (footnote 4) using a formula outlined in ASTM D-790.

The data in Table I illustrate that in mastics containing Type II (air-blown) asphalt the use of general type radial teleblock copolymers (Polymers A, C, E, G), that is those prepared in the presence of tetrahydrofuran, do not improve crack time of the mastic. In fact the crack time is actually decreased from the control mastic where no polymer is present. However, mastics containing polymers prepared in the absence of tetrahydrofuran generally improve crack time (e.g., Polymers B and D). The crack time data indicate that when Type II asphalt is used in the mastic formulation herein described, that the preferred copolymers (prepared in the absence of tetrahydrofuran) to be used are those containing conjugated diene/vinyl aromatic weight ratios of between 60–75/40–25. The flexural strength of most of the mastics containing either type polymer was only slightly decreased.

The data in Table II illustrate that in mastics containing 40–50 penetration grade asphalt the use of general type radial teleblock copolymers (Polymers A and C), that is those prepared in the presence of tetrahydrofuran, give an increase in crack time. The data further indicate runs B, D, and F made according to the invention herein described, that the use of radial teleblock copolymers prepared in the absence of tetrahydrofuran give an even better improvement in crack time to the mastic composition. Using 60/40 conjugated diene/vinyl aromatic copolymers, the improvement in crack time is almost 70 percent with polymers prepared without tetrahydrofuran as compared to only a 21 percent improvement in crack time with radial teleblock copolymers prepared in the presence of tetrahydrofuran. The data also indicate that with polymers prepared without tetrahydrofuran (Polymers B, D, F), there is a gradual decrease in crack time improvement as the conjugated diene level is increased, although all values are still significantly better than the control where no polymer was employed.

The flexural strength of all mastics containing either type polymer was decreased. When a 40–50 penetration grade asphalt is used, the polymer concentration is preferrably about 10 wt. % copolymer in asphalt.

Reasonable variation of modification are possible within the scope of the foregoing disclosure and the appended claims to the invention. The essence of which is that certain conjugated diene/monovinyl substituted aromatic hydrocarbon copolymers, as herein defined, have been found to considerably improve crack time in asphalt compositions indicating an improved resistance to stress cracking, especially at low temperatures and to other degredation which is undesirable.

We claim:

1. An improved composition adapted for coating of an object to be protected such as a pipeline to be laid under the sea, especially in cold water or in a cold climate, and having highly desirable resistance to stress cracking or flexibility at low temperatures of the order of 40° F. (4.4° C.) or lower which comprises asphalt, aggregate, and as desired, a fibrous filler and a conjugated diene/monovinyl aromatic radial teleblock copolymer having been prepared by copolymerizing a conjugated diene having 4 to 8 carbon atoms with a monovinyl-substituted aromatic hydrocarbon having 8 to 12 carbon atoms in presence of an organolithium initiator but in absence of randomizer, or by incremental addition of both monovinyl-substituted aromatic hydrocarbon and initiator, said copolymer having a poly(monovinyl-substituted aromatic hydrocarbon) portion which has a weight average molecular weight of at least 7.5% of the weight average molecular weight of the copolymer, the weight ratio of conjugated diene to vinyl aromatic hydrocarbon is in the approximate range 60-95/40-5, and weight average molecular weight of a copolymer is in the approximate range 70,000-300,000.

2. The composition according to claim 1 wherein the conjugated diene is selected from 1,3-butadiene, isoprene, 2,3-dimethyl-1,3-butadiene, piperylene, 2,4-hexadiene, and 1,3-octadiene and the vinyl substituted aromatic hydrocarbon is selected from styrene, 3-methylstyrene, 4-n-propylstyrene, 4-t-butylstyrene and the weight ratio of the diene to the aromatic is in the approximate range of from about 60/40 to 85/15.

3. A composition according to claim 2 wherein the copolymer is prepared by incremental addition of the monovinyl-substituted aromatic hydrocarbon and initiator, the monomers selected are butadiene and styrene, and the weight average molecular weight of the polystyrene portion is at least about 7.5% of the weight average molecular weight of the copolymer.

4. A composition according to claim 2 wherein the copolymer is prepared from butadiene and styrene in presence of an organolithium initiator but in the absence of randomizer and the weight average molecular weight of the polystyrene portion is at least about 10% of the weight average molecular weight of the copolymer.

5. A composition according to claim 3 wherein the copolymer has a weight ratio of conjugated diene/vinyl aromatic hydrocarbon in the approximate range of 70-85/30-15 and a molecular weight (weight average) in the approximate range of 125,000-200,000.

6. A composition according to claim 4 wherein the copolymer has a weight ratio of conjugated diene/vinyl aromatic hydrocarbon in the approximate range of 70-85/30-15 and a molecular weight (weight average) in the approximate range of 125,000-200,000.

7. A composition according to claim 5 wherein the copolymer is used in an amount of approximately 2-20 weight percent of the asphalt portion of the composition.

8. A composition according to claim 6 wherein the copolymer is used in an amount of approximately 2-20 weight percent of the asphalt portion of the composition.

9. A composition according to claim 7 wherein the asphalt is 40-50 penetration asphalt.

10. A composition according to claim 8 wherein the asphalt is 40-50 penetration asphalt.

11. A composition according to claim 1 wherein the ingredients composited are as follows:

| Ingredient | Weight Percent |
| --- | --- |
| aggregate | 50-70 |
| Finely divided mineral filler | 15-35 |
| Asphalt | 5-20 |
| Fibrous material | 0.05-0.5 |
| Radial teleblock copolymer | 0.1-4.0 |

12. A composition according to claim 1 wherein the ingredients composited are as follows:

| Ingredient | Weight Percent |
| --- | --- |
| aggregate | 55-65 |
| Finely divided mineral filler | 20-30 |
| Asphalt | 8-15 |
| Fibrous material | 0.1-0.5 |
| Radial teleblock copolymer | 0.6-1.8 |

* * * * *